March 10, 1970  J. F. COULEUR ETAL  3,500,329
DATA PROCESSING SYSTEM
Filed Oct. 6, 1966                     6 Sheets-Sheet 2
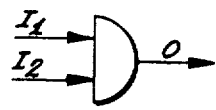
Fig-1a-IV
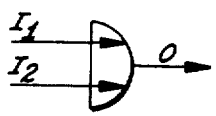
Fig-2a-IV
Fig-3a-IV
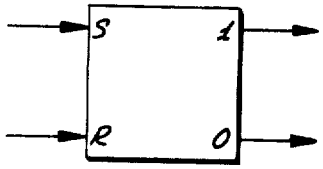
Fig-4a-IV
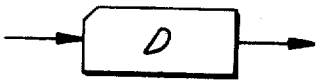
Fig-5-IV
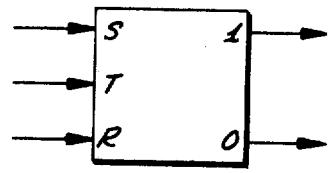
Fig-6-IV

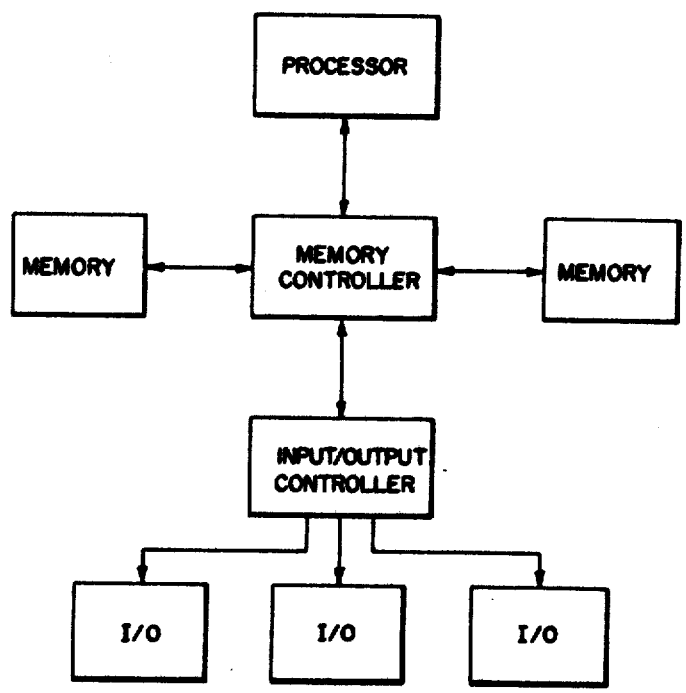
FIG. 1.-I

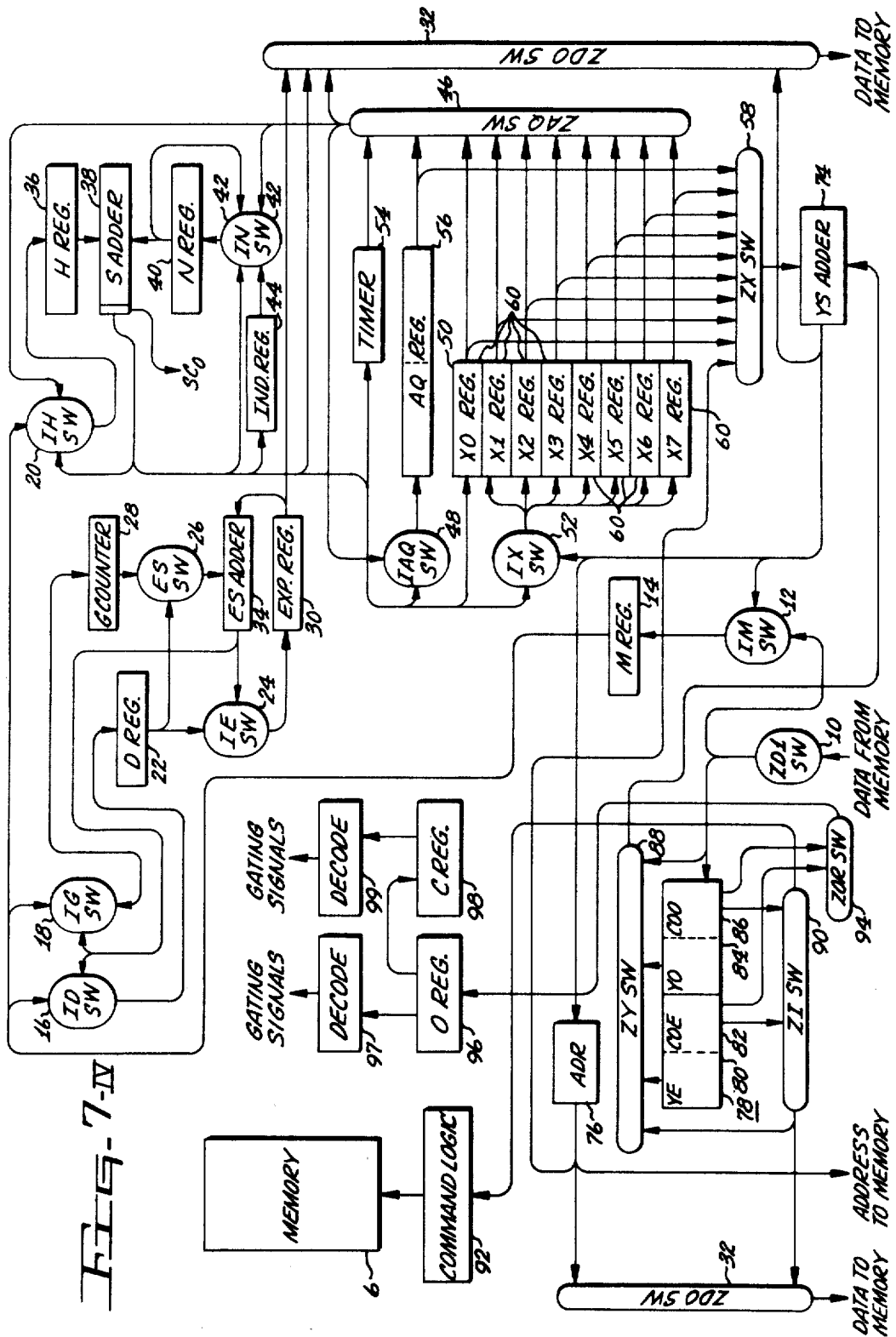

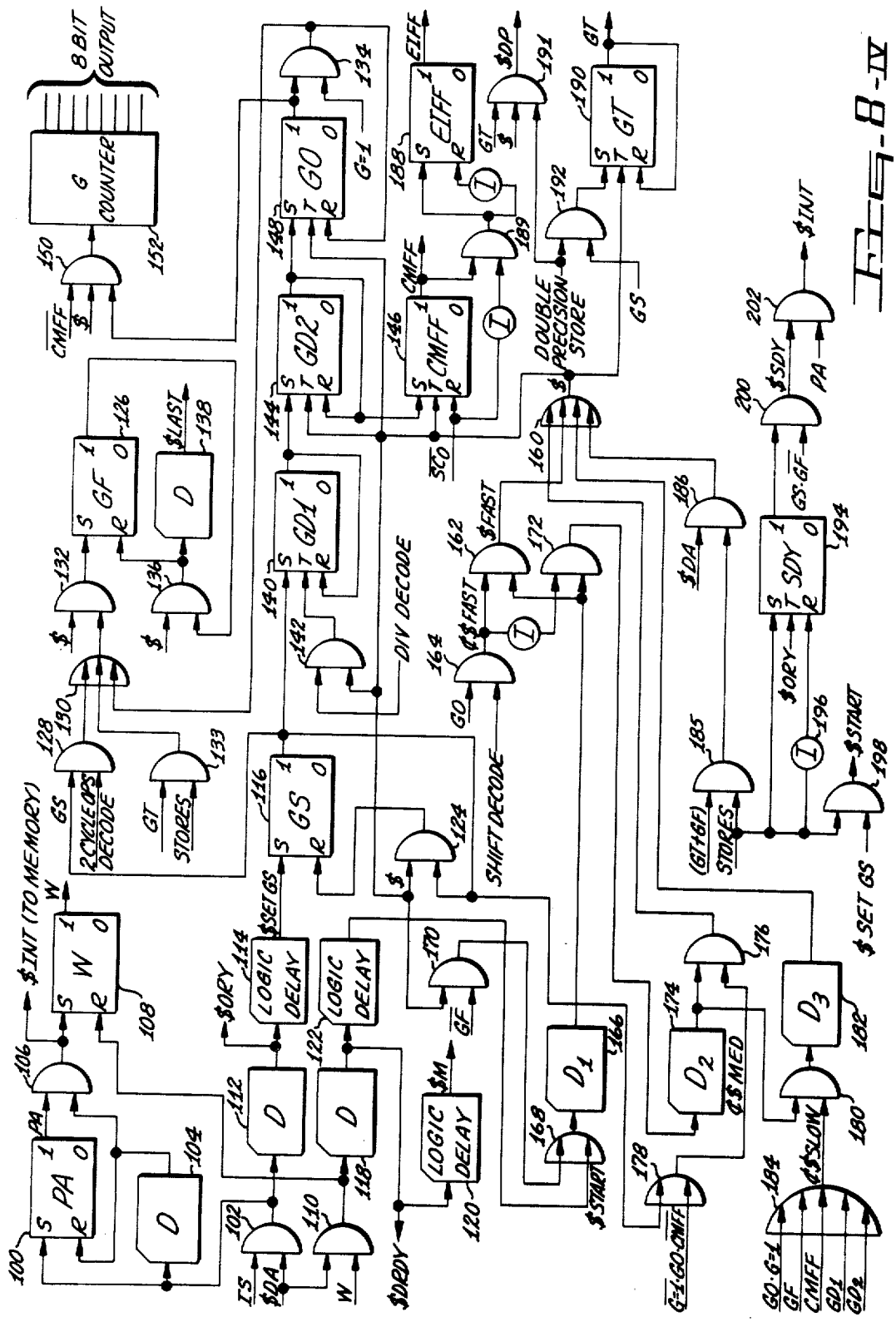

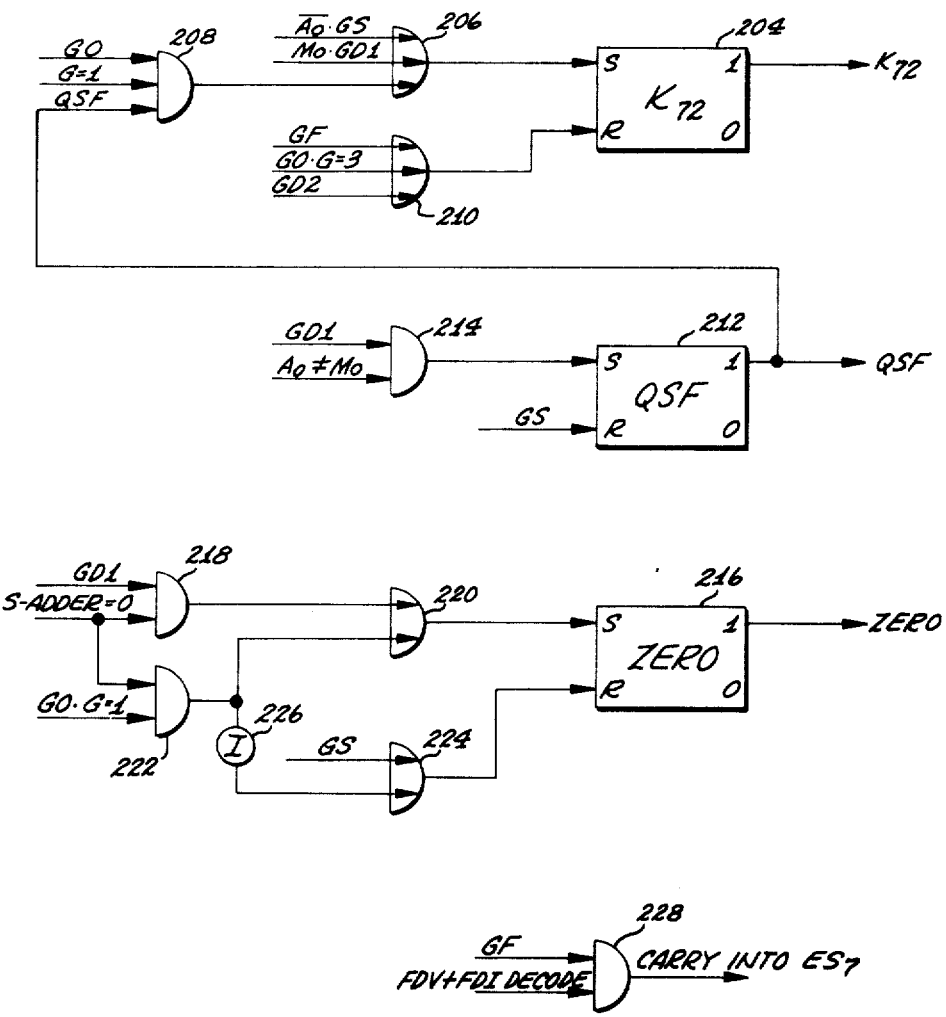
Fig. 9-IV

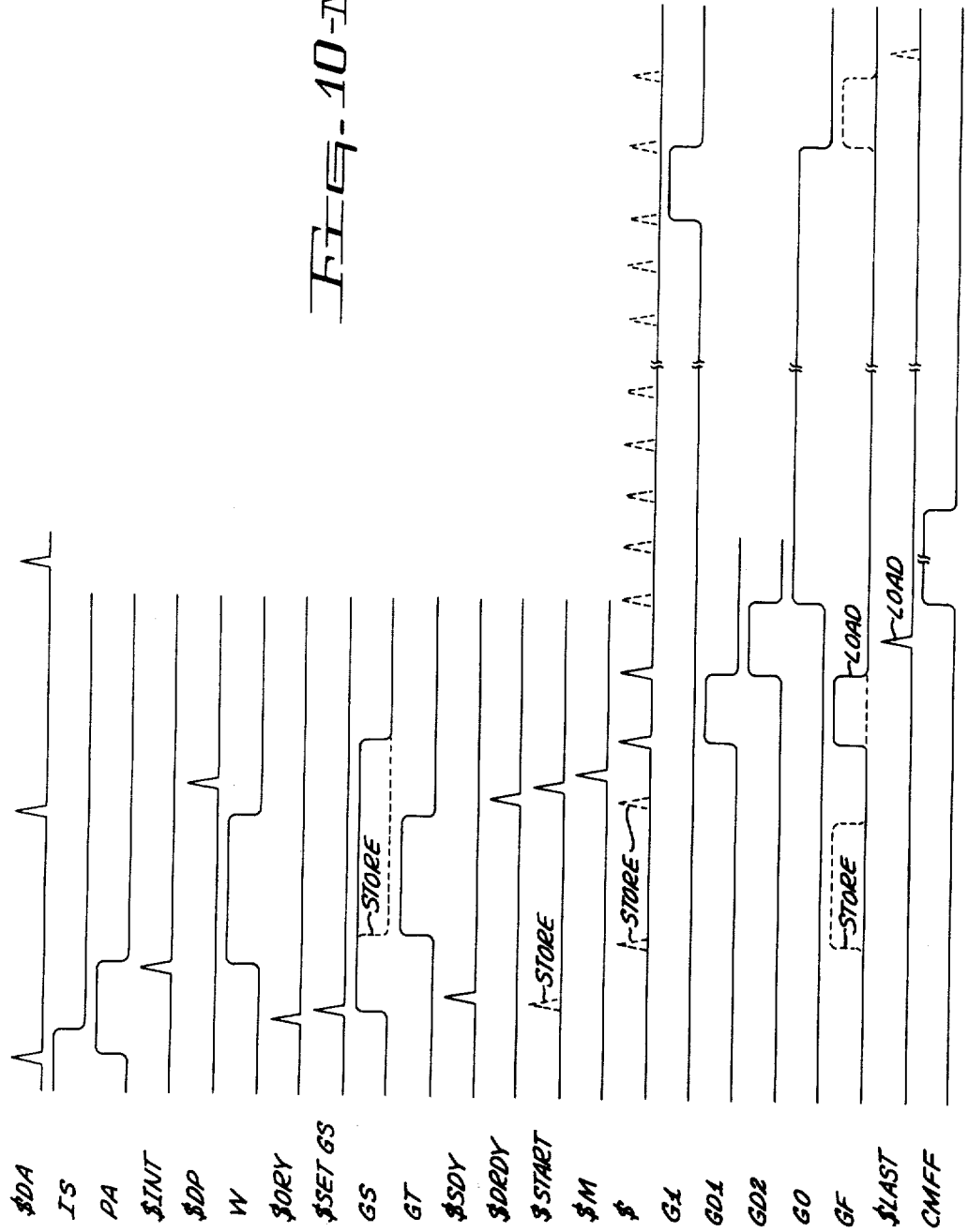

3,500,329
DATA PROCESSING SYSTEM

John F. Couleur, Richard L. Ruth, and William A. Shelly, Phoenix, Ariz., assignors to General Electric Company, a corporation of New York
Filed Oct. 6, 1966, Ser. No. 584,801
Int. Cl. G11b 13/00; G06f 1/00, 7/00
U.S. Cl. 340—172.5             10 Claims

ABSTRACT OF THE DISCLOSURE

A data processing system providing selective access with a memory thereof for a plurality of data processors and input/output controllers, wherein access to the memory is initiated when any one of said processors or input/output controllers supplies interrupt, address, and memory command signals to a memory controller of the system, and wherein the memory controller recognizes the interrupt signals and provides access to the memory according to predetermined priorities allocated to the processors and input/output controllers.

INTRODUCTION

The present invention pertains to data processing systems, and more specifically, to those systems utilizing control means for controlling communication among the subsystems of the data processing system.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily have much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

The utilization of a memory controller in a manner described above provides unusual flexibility when the memory controller permits each of the connected devices (which may be termed communicating devices) to operate asynchronously. Thus, each subsystem may proceed at its own most efficient speed and determine within itself when an appropriate time is reached to request access to memory or to request communication with another subsystem. To enable a subsystem or communicating device to access memory or communicate with another device, the memory controller imposes communication restrictions and dictates the criteria for such communication. For example, in the embodiment chosen for illustration, to access memory, a communicating device must provide to the memory controller a request for access signal, an address, a command code (not to be confused with a coded instruction), and in some instances data. Since it is possible for more than one communicating device to request communication with the memory, the memory controller receives all such requests and awards priority in a predetermined manner.

To further facilitate maximum efficiency the memory controller includes means for notifying a communicating device that it has been awarded priority and that the command code and address accompanying the request for communication has served its purposes and is no longer required by the memory controller. In this manner, the communicating device having been notified may proceed to develop an additional address and command code for the memory controller while leaving the data on its output lines for the use of the memory controller until the controller cycle is completed. The use of command codes unique to the memory controller, the generation of a cycle started signal to indicate that certain information is no longer needed by the memory controller, and the asynchronous operation of all of the subsystems permit the maximum speed and efficiency obtainable in a system including such subsystems.

It is therefore an object of the present invention to provide a data processing system comprising a plurality of subsystems communicating through a memory controller wherein each subsystem operates asynchronously in relation to the remainder of the subsystem.

It is also an object of the present invention to provide a data processing system wherein maximum efficiency and speed are obtained through the utilization of a memory controller for controlling communication among the subsystems in accordance with a priority arrangement and wherein each subsystem determines its own requirement for requesting priority.

It is another object of the present invention to provide a data processing system wherein a plurality of communicating devices or subsystems communicate through a memory controller and wherein memory controller commands distinct from program instructions are used to indicate to the memory controller the type of data manipulation required of it.

It is a further object of the present invention to provide a data processing system wherein memory controller commands are utilized to provide intersubsystem communication and used to define an operation upon data as well as indicate the destination of information provided with the command.

It is another object of the present invention to provide a data processing system wherein a plurality of subsystems communicate through a memory controller and wherein each provides a memory controller command and data with each request for communication.

It is another object of the present invention to provide a data processing system wherein a memory controller provides a cycle started signal to a connected communicating device when said device requests communication to thereby indicate to the communicating device that the command provided to the memory controller is no longer required but that data provided with the command is needed for further operations.

These and other objects and advantages of the present invention will become apparent to those skilled in the art as the description of the invention proceeds.

DESCRIPTION OF FIGURES

The present invention may more readily be described by reference to the accompanying drawings in which:

FIGURE 1–I is a block diagram of a data processing system in a single memory controller configuration;

FIGURE 1a–IV is a schematic representation of an AND-gate as it is used in the description of the present system;

FIGURE 1b–IV is a truth table for the AND-gate of FIGURE 1a–IV;

FIGURE 2a–IV is a schematic representation of an OR-gate as it is used in the description of the present invention;

FIGURE 2b–IV is a truth table for the OR-gate of FIGURE 2a–IV;

FIGURE 3a–IV is a schematic representation of an inverter as it is used in the description of the present invention;

FIGURE 3b–IV is a truth table for the inverter of FIGURE 3a–IV;

FIGURE 4a–IV is a schematic illustration of a standard flip-flop as it is used in the description of the present invention;

FIGURE 4b–IV is a schematic illustration of a trigger flip-flop used in the description of the present invention;

FIGURE 5–IV is a schematic illustration of a means for effecting a time delay in signal transmission;

FIGURE 6–IV illustrates a typical instruction word utilized in the system of the present invention;

FIGURE 7–IV is a major block diagram of the system of the present invention;

FIGURES 8–IV and 9–IV are logic diagrams illustrating the generation of various control and timing signals; and FIGURE 10–IV is a timing chart showing the relationship of signals generated by the logic of FIGURES 8–IV and 9–IV.

GENERAL SYSTEM DESCRIPTION

Referring to FIGURE 1–I, a single memory controller configuration data processing system is shown. The data processing system includes a data processor 1, memory devices 2 and 3, an input/output controller 4, and a plurality of input/output devices 5. The processor, input/output controller, and memories are interconnected by a memory controller 7 which controls all communication among the subsystems and performs certain other tasks as will become more apparent as the description proceeds.

For a complete description of the system of FIGURES 1–I and 1a–IV through 10–IV and of the instant invention which is embodied in such system, reference is made to United States Patents 3,413,613 issued to D. L. Bahrs et al., 3,409,880 issued to G. M. Galler et al., and 3,425,039 issued to D. L. Bahrs et al., all such patents being assigned to the assignee of the present invention. More particularly, FIGURES 2–120 of the drawing; column 1, lines 9–52; column 4, lines 32–75; columns 5–7; column 8, lines 1–21; column 8, lines 33–75; and columns 9–121, lines 1–43 of United States Patent 3,413,613; FIGURES 1–188; column 3, lines 40–75; columns 4–103 and column 104, lines 1–36 of United States Patent 3,409,880; and FIGURES 1–20; column 2, lines 38–75; columns 3–24; and column 25, lines 1–45 of United States Patent 3,425,039 are all incorporated herein by reference and made a part of the instant patent application.

GENERAL DESCRIPTION

Before proceeding with a detailed explanation of the figures, a brief explanation of the manner in which this discussion will be presented is believed desirable. In the ensuing discussion of the figures, the lines which interconnect the various elements and which represent paths of information (e.g., instruction words and data words) movement are often representative of multiple line buses, the number of lines of which will vary in accordance with the individual situation. Additionally, the logic utilized is meant to be representative of the function desired and is not to be limited to the specific logic shown. For example, if an AND-gate were shown having a data bus input and a control line input with the output of this gate being a data bus, this would represent the gating of the information on the several lines of that bus by the action of that control signal.

A great number of the components shown throughout the drawing are in the form of blocks or a similar symbology and these are used to represent logic configurations or components which are well-known in the art such as adders, registers, switches, decoding logic, etc. The details of these items, which are considered well-known, are not shown except where it is believed desirable for the purpose of more fully understanding the invention. It is also to be expressly understood that a system of the complexity of which the present invention comprises a part will have a large number of interrelated control signals which, while they are important to the functioning of the operation of the total system, do not play a direct, significant part in the operation of the present invention. Therefore, in order to represent the instant invention in its simplest and most readily comprehensible form, these signals have been omitted and only those control signals which contribute directly to the functioning of the system have been included.

In the subsequent discussion of the present invention, the logic utilized employs the so-called "conventional" AND-gates, OR-gates and inverters. An AND-gate, represented in FIGURE 1a–IV, is a multiple input logic element whose output is at a high level (a binary 1) only when all of its inputs are at a high level. A truth table for the AND-gate of FIGURE 1a–IV is shown in FIG- URE 1b–IV. An OR-gate, FIGURE 2a–IV, is a multiple input logic element whose output is a binary 1 when any one or more of its inputs is a binary 1. A truth table for an OR-gate is shown in FIGURE 2b–IV. While only a two input AND-gate and OR-gate have been illustrated, it is to be realized that additional inputs are possible. However, the same logical relationship exists for these gatse employing more than two inputs.

An inverter, FIGURE 3a–IV, is a single input, single output logic element whose output is, as the name implies, the inverse of its input. More explicitly, if the input to an inverter is a binary 1, the output will be a binary 0, while if the input is a binary 0, the output will be a binary 1. A truth table for an inverter is illustrated in FIGURE 3b–IV.

A flip-flop, as the term is used in the description of this portion of the present invention, is a bistable device whose output is a function of its last input. Two types of flip-flops are shown. The first of these, FIGURE 4a–IV, is a two input, two output device having set (S) and reset (R) input terminals and one and zero output terminals. In this type of device, a binary 1 suppplied to the set (S) terminal places the flip-flop into its set state in which condition there is a binary 1 at its one output terminal and a binary 0 at its zero output terminal. Conversely, a binary 1 supplied to the reset (R) terminal places the flip-flop into the state in which there is a binary 1 at its zero output terminal and a binary 0 at its one output terminal. The second type of flip-flop illustrated (FIGURE 4b–IV) differs only from that of FIGURE 4a–IV by the inclusion of a third, or trigger, input terminal T. The operation of the flip-flop shown in FIGURE 4b–IV is essentially identical to that of the flip-flop in FIGURE 4a–IV except that there must be a binary 1 at the T input terminal at the same time there is a binary 1 at either of the set or reset terminals in order for the flip-flop to change its state.

Shown in FIGURE 5–IV is a symbol utilized in the subsequent description for a signal delay means. Two types of delay means are found in the present description. The first of these delay means is a specific unit introduced into the system for that purpose. Examples of such devices include one-shot multivibrators or magnetostrictive delay lines. The second type of delay means found in the ensuing description is that delay which is inherent when there exists an appreciable amount of circuitry through which a signal must be passed. Insofar as signal generation and operation are concerned, however, the effect of these two types of delay means is identical; that is, the delaying in time of a signal without appreciable attenuation of its strength. It is, of course, recognized that any transmission of a signal along a line or through logic circuitry results in a finite amount of time delay. In the present description, however, those elements designated as logic delay means are representative of those instances where the delay in time of the signal is purposefully utilized in the system.

In the specific embodiment of the invention here being described, information items (instruction words and data words) are thirty-six bits in length. FIGURE 6–IV illustrates a typical instruction word. Referring now to FIGURE 6–IV it is seen that the most significant half of the word, bits 0–17, contains the address of a particular location in memory. The next nine bits, bits 18–26, comprise the operation code portion of the instruction word. It is this portion which designates the operation to be performed. Bits 27, 28 and 29 are not utilized in the presently being described invention. The last six bits, bits 30–35, collectively form what is known as the tag field. The tag field directs the address development and formulation of instruction words. Data words, as has been previously stated, are also thirty-six bits in length and will have a format which varies in accordance with the individual circumstances. For example, a data word might be comprised of an eight bit exponent (bits 0–7) and a twenty-eight bit mantissa (bits 8–35). A double precision word is 2 thirty-six bit words considered together.

Referencing now FIGURE 7–IV, there is shown a major block diagram of the processor of the system embodying the present invention. For a more complete description of the entire data processing system employing the present invention, reference is made to the copending application Ser. No. 555,165 entitled "Data Processing System Including Plural Memory Controllers," filed June 3, 1966, by David L. Bahrs et al. and assigned to the assignee of the present invention.

FIGURE 7–IV illustrates the major registers and additional components which provide and which accept the several signals which are transmitted between the various components comprising a complete data processing system as is explained in the aforementioned patent application, Ser. No. 555,165. The illustration of FIGURE 7–IV further depicts the nature of components included within the arithmetic unit which forms the present invention. As is set forth in the aforementioned copending patent application the major communication link to and from the processor is to a memory controller which includes the basic memory storage of a data processing system.

Referring now specifically to FIGURE 7–IV, there is shown a memory unit 6, hereinafter referred to as the memory, which for purposes of this discussion may be considered as including a plurality of selectively addressable storage locations for the storage of information items as is known in the art. Information items in the form of either instruction words or data words enter the processor from the Memory 6 via a ZDI Switch 10. From the ZDI Switch 10, incoming information items may be directed along one of three basic paths. The first of these paths is from the ZDI Switch 10 to an IM Switch 12 and from thence to a seventy-two bit register designated as the M-Register 14. From the M-Register 14 the information item, which hereinafter may be referred to as data, is directed to one of three switches, an ID Switch 16, an IG Switch 18, or an IH Switch 20. From the ID Switch 16 data is transferred to an eight bit D-Register 22 whose output is selectively delivered to either an IE Switch 24 or an ES Switch 26. The D-Register is an eight bit temporary holding register for the exponent portion of a data word as will be more fully explained hereinafter. The ES Switch 26 may also receive data from a G Counter 28 which is an eight bit multi-function counter facilitating the control of several arithmetic operations. The G Counter in turn receives data from the IG Switch 18.

The IE Switch 24 has its output connected to an Exponent Register 30 which, in the present embodiment, is a ten bit register (eight magnitude bits plus two bits of sign extension) which holds the exponent portion of a floating point word. The output of the Exponent Register 30 may be delivered either to a ZDO Switch 32 whose output is delivered to the Memory 6 of the system or to an ES Adder 34. The ES Adder 34 is a ten bit full adder which accumulates, increments and decrements to the exponent portion of a floating point word. The output of the ES Adder 34 is connected to the IE Switch 24 and also to the ID Switch 16 and the IG Switch 18.

The output of the IH Switch 20 is to a seventy-two bit H-Register 36 which provides one of the inputs to the main or S Adder 38. The H-Register normally contains an operand from memory. (In the present description, the word operand is used to designate that portion of an information item which is to be operated upon.) The S Adder 38 is a seventy-two bit full adder which performs the functions of algebraic addition, inclusive and exclusive OR, and the logical product (AND) of the operands contained in the H-Register and a second register, the N-Register 40, which also forms an input to the S Adder 38. The input to the N-Register 40 is via an IN Switch 42 whose inputs are from several sources. One of the inputs to the IN Switch 42 is from the N-Register while a second input is from the S Adder 38. The IN Switch 42 may also receive data from a ten bit Indicator Register 44 which serves to store the status of arithmetic functions. The input to the Indicator Register 44 is from the S Adder 38. The last input to the IN Switch 42 is from a ZAQ Switch 46. The ZAQ Switch 46 is a seventy-two bit set of parallel switches whose output is normally used for register modification or stores. Other outputs of the ZAQ Switch 46, whose inputs will be discussed hereinafter, are to the IH Switch 20 and to the ZDO Switch 32.

In addition to the outputs to the IN Switch 42 and the Indicator Register 44, the output of the S Adder may be directed to the IH Switch 20 or it may go directly to the ZDO Switch 32. The output of the S Adder 38 may also form an input to an IAQ Switch 48 as well as to the XO Register 50 or an IX Switch 52. The output of the S Adder may also form an input to a Timer 54 whose output forms one of the inputs to the ZAQ Switch 46. The Timer 54 acts as a clock for determining the amount of time allotted to an object program by a master program.

As has been previously stated, the IAQ Switch 48 has, as one of its inputs, the output of the S Adder 38. The second input to the IAQ Switch 48 is from the ZAQ Switch 46. The output of the IAQ Switch 48 is to a seventy-two bit register designated the Accumulator or AQ-Register 56. This register is comprised of 2 thirty-six bit portions, the A portion and the Q portion. The output of the AQ-Register 56 forms an input to the ZAQ Switch 46 and additionally an input to another switching block designated as the ZX Switch 58. The ZX Switch 58 is a bus of parallel switches whose primary function is to switch the register selected to be utilized in address development.

The ZX Switch 58 further receives data from one of 8 eighteen bit Index Registers collectively designated by the reference character 60. The eight Index Registers are individually identified as X0–X7. As was previously stated, the X0 Register 50 receives data from the S Adder 38 while data to the X1–X7 Registers is directed to the appropriate ones by means of the IX Switch 52. The eight Index Registers 60 also provide outputs to the ZAQ Switch 46.

Data from the ZX Switch 58 is supplied to an eighteen bit YS Adder 74 which is a general purpose adder used to form addresses for instructions, perform modifications of indirect words, alter the Index Registers 60, etc. The output of the YS Adder may be directed to the ZDO Switch 32, the IM Switch 12 or the IX Switch 52. The output of the YS Adder may also be directed to an eighteen bit Address Register 76, one output of which is also directed to the ZDO Switch 32. Additional outputs from the Address Register 76 are directed to the Memory 6 and to the ZX Switch 58.

The second path incoming data can take from the ZDI Switch 10 is to a plurality of four registers 78, which are collectively known as the Instruction Registers. The Instruction Registers 78 consist of 4 eighteen bit registers, namely a YE-Register 80, a COE-Register 82, a YO-Register 84 and a COO-Register 86. As the name implies, the Instruction Registers 78 serve to hold the instruction words brought from the Memory 6. In the normal operation of the presently being described system, instruction words of thirty-six bits each are brought from the memory in pairs. Under suitable gating, the address portion of the first or even instruction of a pair is placed in the YE-Register 80 while the command portion of this even instruction (bits 18–35) is placed into the COE-Register 82. Similarly, the address portion of the odd instruction of a pair is placed into the YO-Register 84 while the command portion of the odd instruction is placed into the COO-Register 86.

The third path which data entering the processor via the ZDI Switch 10 may follow is from the ZDI Switch to a ZY Switch 88 and from that element through the ZX Switch 58 to the YS Adder 74. The contents of the YE- and YO-Registers, 80 and 84 respectively, also may be transferred via the ZY Switch 88 and the ZX Switch 58 to the YS Adder 74.

The contents of the COE and COO Registers 82 and 86 are selectively transferred via a ZI Switch 90 to a block 92 designated as the Command Logic. The Command Logic decodes the operation code portion (bits 18–26) of an instruction word and transmits this information to the memory unit of the system to direct the operation of that unit. (For a more complete description of the operation and function of the Command Logic 92 reference is made to the aforementioned patent application Ser. No. 555,165.) The ZI Switch 90 also provides outputs to the ZY Switch 88 and to the ZDO Switch 32 for the transferring of data, respectively, through the YS Adder 74 and to the memory of the system.

The contents of the COE-Register 82 and COO-Register 88 may also be transferred under suitable circumstances via a ZOR Switch 94 to an O-Register 96. The O-Register 96 is a nine bit register which temporarily holds the operation designator which is normally obtained prior to completion of the preceding operation. One output of the O-Register 96 is to a C-Register 98 which is a nine bit secondary operation designator register. As illustrated in FIGURE 7–IV, the outputs of the O-Register 96 and the C-Register 98 are connected to two decoding matrices 97 and 99 respectively with the output of these two decoding matrices 97 and 99 being certain gating signals utilized in developing the timing sequence as will be more fully explained hereinafter.

TIMING

Some means must be present for providing the basic time periods in which the various functions occur in the arithmetic operations which are to be subsequently described. FIGURES 8–IV and 9–IV, taken in conjunction with the timing diagram of FIGURE 10–IV, illustrate the manner in which the several necessary timing signals to perform the arithmetic functions are derived. FIGURES 8–IV and 9–IV illustrate the manner in which the several signals are generated, while the timing diagram of FIGURE 10–IV illustrates the time relationship among the several timing signals.

Referencing now these figures, it is seen that there is shown a PA flip-flop 100 whose set input terminal is connected to the output of a two input AND-gate 102. The PA flip-flop 100 is, therefore, placed into its set state when there is the simultaneous application to the AND-gate 102 of a signal IS and a second signal $DA. The IS signal is one generated by the processor to signify that the previous memory access was an instruction word. The $DA signal is sent to the processor by the memory unit to indicate that data or information requested is available on the input bus at the ZDI Switch 10 (FIGURE 7–IV) to the processor or that the data sent to the unit for storage has been stored. The output from the AND-gate 102 is also supplied to a delay means 104 the output of which serves to reset the PA flip-flop 100. The output of the delay means 104 is also combined in an AND-gate 106 with the one output of the PA flip-flop 100 to provide an $INT signal. This signal is that which the processor utilizes to communicate to the memory that the processor desires to perform a memory access. For a more complete description of this signal and the previously discussed $DA signal, reference is made to the aforementioned patent application, Ser. No. 555,165. This same output from the AND-gate 106 is applied to the set terminal of a W flip-flop 108. The one output of this flip-flop is a level denoting that the processor is waiting for an operand. The W flip-flop 108 is reset, as is illustrated in FIGURE 8–IV, at the time of the next $DA pulse which, as is indicated, is AND-ed in a gate 110 with the W signal to reset the W flip-flop 108. The output of the AND-gate 102, the conjunctive combination of the IS and $DA signals, is also applied to a delay means 112, the output of which is designated as $ORY. Referencing FIGURE 10–IV, it is seen that the generation of $ORY is delayed until a time approximating the termination of the IS signal. The output of the delay means 112 is further delayed by logic within the system represented by block 114 to form a signal $SETGS which, as the name indicates, serves to set a GS flip-flop 116.

In addition to resetting the W flip-flop 108, the output of AND-gate 110 is applied to a suitable delay means 118, the output of which is designated $DRDY. This same signal is further delayed by means of appropriate logic represented by block 120 to become a $M signal. The output of the delay means 118 is also processed through logic delay designated 122 to become a signal designated $START. As is best seen in FIGURE 10–IV, the $START signal is a pulse which occurs a short time after the $DRDY signal and a short time before the $M signal. (The generation of the $START signal shown in dotted lines and labeled STORE will be described hereinafter.) The GS flip-flop 116 is reset as a function of the output of a two input AND-gate 124 whose two inputs are the GS signal and a signal designated $, the generation of which is to be described.

A GF flip-flop 126 may be set in one of three ways. The first of these ways is by a combination of the GS signal from the GS flip-flop 116 as AND-ed in an AND-gate 128 with a signal designated Two Cycle Ops Decode. This latter signal is derived from either of the decoding matrices 97 or 99 (see FIGURE 6–IV). The output of the AND-gate 128 forms one input to a three input OR-gate 130, the output of which forms one input to a two input AND-gate 132 whose other input is the $ signal. The output of the AND-gate 132 serves to set the GF flip-flop 126. The second way in which the GF flip-flop 126 may be placed into its set state is as a result of the output of an AND-gate 134 which forms a second input to the OR-gate 130. The third manner of setting the GF flip-flop 126 involves the conjunctive combination of a GT signal from a GT flip-flop 190 and a STORES signal within an AND-gate 133, the output of which forms one input to the OR-gate 130. The STORES signal is obtained from the Decode Matrix 97 (FIGURE 7–IV) and indicates that the instruction being performed is one which causes information to be stored in the memory. The GF flip-flop 126 is reset at the next occurrence of the $ signal by AND-ing this $ signal with the GF signal in an AND-gate 136. The output of the AND-gate 136 is applied to the reset of the GF flip-flop 126. The output of the AND-gate 136 also forms an input to a delay means 138, the output of which is designated as $LAST which, as may be seen in FIGURE 10–IV, occurs a short period after the resetting of the GF flip-flop 126.

A GD1 signal shown in FIGURE 10–IV is the one output of a GD1 flip-flop 140 which is placed into its set state by the one output of the GS flip-flop 116. The GD1 flip-flop 140 is a trigger flip-flop and, as such, can only have its state changed when the input to the trigger terminal is at a higher level. As shown, the input to the trigger will be high when the output of an AND-gate 142 is high. This is achieved by the simultaneous application to the AND-gate 142 of two signals, $ and Div Decode. The Div Decode signal results from the decoding, in the matrices 97 or 99 (see FIGURE 6–IV), of an instruction word specifying a divide operation. The GD1 flip-flop is reset by the application of the GD1 to its reset terminal at the occurrence of the next $ signal.

An additional flip-flop, GD2 flip-flop 144, is placed into its set state by the simultaneous application of the GD1 signal to its S terminal and the S signal to its trigger terminal. This flip-flop is reset with the next succeeding $ signal by the application, to its reset terminal, of the GD1 signal to its S terminal and the $ signal to its trigger 144 also forms an input to the set terminals of two additional flip-flops, a CMFF flip-flop 146 and a GO flip-flop 148. As shown in FIGURE 8–IV, each of these flip-flops is a trigger flip-flop requiring the application of the $ signal to its respective trigger terminal before its state can be changed. The CMFF flip-flop 146 is reset by the application thereto of a signal designated as $\overline{SC_0}$. (This signal is derived from the zero bit position of the S Adder 38 (FIGURE 7–IV) an reflects the condition of the contents of that bit position; i.e., the $\overline{SC_0}$ signal is at a high level (binary 1) when there is a binary 0 in the zero bit position of the S Adder.) The GO flip-flop 148 is placed into its set state by the application of the GD2 signal to its set terminal. The output of this flip-flop is applied as one input to a three input AND-gate 150, the other two inputs of which are the $ signal and a $\overline{CMFF}$ signal which designates that CMFF is in its reset state. The output of the AND-gate 150 is applied to a G Counter 152. Thus the G Counter 152 decrements with each occurrence of the $ signal when the GO flip-flop 48 is set and the CMFF flip-flop 146 is reset. The G Counter 152 counts down to zero from a maximum count of 256 and provides an eight bit output indicative of its present count.

The output of the GO flip-flop 148 also forms one input to the AND-gate 134, the output of which functions to reset the GO flip-flop 148 and the GF flip-flop 126. The second input to the AND-gate 134 is the signal G=1 which indicates that the eight bit output of the G Counter 152 is equal to a 1.

The manner in which the several $ signals are generated is also illustrated in FIGURE 8–IV. As there shown, the $ signal is the output of a four input OR-gate 160. One of the inputs to the OR-gate 160 is a signal designated $FAST which is the output of an AND-gate 162. The first input to the AND-gate 162 is designated as ¢$FAST and is the output of a two input AND-gate 164 having inputs respectively from the GO flip-flop 148 and a second signal designated as SHIFT DECODE which originates in the decoding matrices 97 and 99 (see FIGURE 6–IV) and indicates that the instruction being executed is one requiring a shifting operation. The second input to the AND-gate 162 is from a delay means $D_1$ 166 whose input is the output of a two input OR-gate 168. One input of the OR-gate 168 is the $START signal previously described. The second input to the OR-gate 168 is from a two input AND-gate 170. The inputs to the AND-gate 170 are the $ signal and the GF signal from the 1 output terminal of the GF flip-flop 126.

A two input AND-gate 172 has as one of its inputs the inverted signal from the AND-gate 164 and as a second input the output of the delay means $D_1$ 166. The output of AND-gate 172 forms the input to a second delay means 174 ($D_2$) whose output forms one input to the two input AND-gate 176 the output of which forms one of the four inputs to the OR-gate 160. The second input to AND-gate 176 is a signal designated ¢$MED which is the output of the two input OR-gate 178. The first input to the OR-gate 178 is the GS signal (the one output of the GS flip-flop 116). The second input to the OR-gate 178 is represented by the equation:

$$\text{Input} = \overline{G=1} \cdot GO \cdot \overline{CMFF}$$

The output of the $D_2$ delay means 174 also forms an input to a two input AND-gate 180 whose output when delayed by means of a $D_3$ delay means 182 forms the third input to the OR-gate 160. The second input to the AND-gate 180 which is designated as ¢$SLOW is the output of a five input OR-gate 184. The ¢$SLOW signal may be represented by the following equation:

$$\text{¢\$SLOW} = (GO \cdot G=1) + GF + CMFF + GD_1 + GD_2$$

The last input to the OR-gate 160, and hence the last manner in which the $SIGNAL may be generated is from the output of a two input AND-gate 186 whose output is defined by the equation:

$$\text{Output} = \$DA \cdot [(GT + GF) \cdot STORES]$$

An EIFF flip-flop 188 is placed into its set state by the high level output signal from an AND-gate 189. The output of AND-gate 189 is at a high level when it receives the high level inputs CMFF and $SC_0$. The inverted output of AND-gate 189 is applied to the reset terminal of the EIFF flip-flop 188 to place it into its reset state.

The output of an AND-gate 192 forms the input to the S Terminal of a GT flip-flop 190. This AND-gate output is high upon the simultaneous application thereto of the GS signal (from GS flip-flop 116) and a signal designated Double Precision Store. This latter signal is derived from the decode matrices 97 and 99 in response to an instruction directing the storing in memory of a double precision word (2 thirty-six bit words). Thus, with the application of the first of those $ signals designated by the legend "STORE" in FIGURE 10–IV, the GT flip-flop 190 may be placed into its set state. The GT flip-flop 190 resets as a function of itself upon the occurrence of the next $ signal (the second $ pulse shown in dotted lines in FIGURE 10–IV).

Referencing still FIGURE 8–IV, it is seen that the STORES signal which formed an input to the AND-gate 185 is also applied to the set (S) terminal of an SDY flip-flop 194 to thereby place this flip-flop into its set state when the $ORY signal is applied to the trigger terminal thereof. The SDY flip-flop 194 is reset with the next occurrence of the $ORY signal by applying the STORE signal, through an inverter 196, to the reset terminal of that flip-flop.

The STORES signal is also utilized to generate the $START signal for store type operations which, as is illustrated in FIGURE 10–IV by the dotted line pulse labeled "STORE," occurs earlier in time than the $START pulse for other types of operations. The generation of the $START signal is shown in FIGURE 8–IV as the conjunctive combination of the STORE signal with the $SETGS signal in an AND-gate 198.

The 1 output of the SDY flip-flop 194 forms an input to a two input AND-gate 200, the second input of which is the signal GS·$\overline{GF}$. This latter signal designates that the GS flip-flop is set and that the GF flip-flop is not set. The output of the AND-gate 200 is designated $SDY and when this signal is combined in an AND-gate 202 with the output of the PA flip-flop 100 there is generated that $INT signal shown in FIGURE 10–IV.

The last signal generated in FIGURE 8–IV is a $DP signal which specifies the second half of a double precision operation. The $DP signal is the output of an AND-gate 191 whose inputs are the GT, $ and Double Precision Store signals. Thus, with the occurrence of the $ signal during GT time of a Double Precision Store operation, the $DP signal will be generated.

FIGURE 9–IV illustrates the generation of three flag signals and one signal level which are set under certain prescribed circumstances and are necessary for the understanding of the arithmetic operations of the present invention which are to be described hereinafter. A $K_{72}$ flip-flop 204 is placed into its set state by the application to its set terminal of a signal from a three input OR-gate 206. The output of OR-gate 206 will be high when any one or more of its three input signals is high. The first input to the OR-gate is designated as $\overline{A_0}$·GS. This designates that the zero bit of the AQ-Register 56 (FIGURE 7–IV) is a binary 0 and the GS flip-flop is set. The second input to the OR-gate 206 is a signal designated $M_0$·GD1. (The first bit of the contents of the M-Register is a binary 1 and the GD1 flip-flop is set.) The third input to the OR-gate 206 is from a three input AND-gate 208 whose three inputs are the output of the GO flip-flop, the output of a QSF flip-flop 212 and the signal G=1 (indicating that the G Counter 28 of FIGURE 7–IV has reached a count of 1). The $K_{72}$ flip-flop is reset as a function of a three input OR-gate 210 whose inputs are the outputs of GF and GD2 flip-flops 126 and 144 respectively (FIGURE 8–IV), and a third signal,GO·G=3.

A QSF (Quotient Sign) flip-flop 212, of which mention was previously made with respect to the setting of the $K_{72}$ flip-flop, is placed into its set state as a function of the output of an AND-gate 214. The two inputs to AND-gate 214 are the output of the GD1 flip-flop 140 and a second signal designated $A_0 \neq M_0$. This latter signal requires that the zero bit positions of the M-Register and the AQ-Register are not the same. Thus, the QSF flip-flop will be placed into its set state during GD1 time if the zero bit of the AQ- and M-Registers are not the same. The QSF flip-flop is placed into its reset state by the application of the output of the GS flip-flop 116 (FIGURE 8–IV) to its reset terminal.

The third flip-flop shown in FIGURE 9–IV is a Zero flip-flop 216. A two input AND-gate 218, when supplied with the GD1 signal along with a signal specifying that the contents of the S Adder 38 (FIGURE 7–IV) are zero, supplies an output to a two input OR-gate 220 whose output serves to set the Zero flip-flop 216. The S Adder equals 0 signal also forms one input to a two input AND-gate 222, the second input of which is designated GO·G=1 indicating that the GO flip-flop 148 is set and that the count in the G Counter 152 equals 1. With the combination of these two signals the output of the AND-gate 222 becomes high, forming an input to the OR-gate 220 to thus serve as another means of setting the Zero flip-flop 216. The Zero flip-flop 216 is reset by the output of a two input OR-gate 224, one input of which is the GS signal and the second input of which is the output of the AND-gate 222 inverted by means of an inverter 226.

The last signal shown generated in FIGURE 9–IV and the last signal which is considered necessary to the operation of the system of the present invention is a signal Carry into $ES_7$. This is a level signal and is the output of an AND-gate 228 whose two inputs are the GF signal from the GF flip-flop 126 and a signal designated FDV+FDI Decode. As was the case with similar type signals previously described, the FDV+FDI Decode signal results from the decoding of a command portion of an instruction word in the matrices 97 and 99 of FIGURE 7–IV and specifies that the instruction being executed is either that known as Floating Divide or Floating Divide Inverted.

The above described signals are those which are believed to be primarily instrumental in the operation of the arithmetic operations subsequently to be described.

ARITHMETIC OPERATIONS

The purpose of the foregoing descriptions of the basic data paths within the processor and of the generation of the several timing and gating signals was to provide a background for the understanding of the various operations to be subsequently described and which are termed arithmetic operations. As will be understood by those skilled in the art, the several timing signals are utilized through suitable logic to effect the transferring of information items or data between the various components of the processor. While it is realized that considerable amounts of logic and circuitry are necessary to permit this transferring it is not believed necessary to describe this logic and circuitry in detail and, therefore, the subsequently to be described arithmetic operations will be explained solely with respect to the block diagram of FIGURE 7–IV in conjunction with the various signals whose generation was explained with respect to FIGURES 8–IV, 9–IV and 10–IV.

It will be remembered that, in the description of data paths of FIGURE 7–IV, reference was made to an Exponent Register 30. Because this is a separate temporary storage means or register capable of manipulation independently of the other registers within the system, several advantages are enjoyed which will become apparent as this description proceeds; e.g., greater versatility in arithmetic operations because of the ability to handle exponents and mantissas separately and the greater relative precision of a full word length (thirty-six bits in a single precision word and seventy-two bits in a double precision word) mantissa. As will also be further described hereinafter, provision is made for dividing two numbers in an inverted sense which allows greater computation speed in that a division operation may be performed regardless of the relative positions of a division and a dividend.

The subsequent description will be divided into essentially three parts, the first part illustrating the separate manipulation of the exponent and mantissa, the second part demonstrating the ability to concurrently act upon an exponent and a mantissa of a floating point word, and the third portion illustrating the dividing operation.

Exponent register operation

Before beginning with a description of illustrative instructions, it is believed advantageous to reiterate that instructions are brought from the memory to the processor in pairs. The instructions are placed, as was previously described, into the Instruction Registers 78 with that instruction which was obtained from an even address being placed into the YE- and COE-Registers and that instruction which was obtained from an odd address into the YO- and COO-Registers.

Three instructions are illustrative of the ability to separately manipulate and operate the Exponent Register 30 (FIGURE 7–IV). These instructions are mnemonically LDE, ADE and STE. These mnemonics designate, respectively, the instructions Load Exponent Register, Add Exponent Register and Store Exponent Register.

*LDE—Load Exponent Register.*—Referencing once again FIGURE 7–IV taken in conjunction with the explanation of the generated timing signals (FIGURES 8–IV and 9–IV) and the timing chart of FIGURE 10–IV, two instructions are brought from the memory in the course of instruction execution and, for purposes of this description, it shall be assumed that the instruction placed into the YE- and COE-Registers is the LDE instruction. The LDE instruction is brought into the processor from the memory with the occurrence of the $DA signal as is described in the foregoing patent application Ser. No. 555,165, The $DA signal sets the PA flip-flop 100 and serves to generate the $ORY and $SETGS signals. As was previously stated, the $DA signal is delayed and combined with the output of the PA flip-flop to generate the $INT signal and to set the W flip-flop 108. The $INT signal, as is explained in the aforementioned copending patent application, is sent back to the memory along with the address contained in the LDE instruction word (from the YE-Register 80) to obtain an operand from the Memory 6 at the designated memory location.

In response to the $INT signal and the address, the memory will transmit the specified operand, which in the present instance is bits 0–7 of the memory location specified by the address portion of the LDE instruction, to the processor and this operand appears at the ZDI Switch 10 with the occurrence of the second $DA signal shown in FIGURE 10–IV. At this time the W flip-flop is reset. The $DA signal which signifies that the operand is present at the ZDI Switch is that which is utilized to generate the $DRDY and $M signals (after suitable delay) as has been previously explained. The $START signal (that shown in solid line in FIGURE 10–IV) delayed in the presently being described system approximately 320 nanoseconds, becomes the first $ signal shown as a solid line in FIGURE 10–IV. This $ signal resets the GS flip-flop which was previously set by the $SETGS signal and sets the GF flip-flop. With the occurrence of the $M signal the data is delivered from the ZDI Switch 10 through the IM Switch 12 into bit positions 64–71 of the M-Register 14. With the setting of the GF flip-flop and the resetting of the GS flip-flop 116 the data or operand within the M-Register 14 is delivered via the ID Switch 16 into the D-Register 22. The $ signal which set the GF and reset the GS flip-flops is delayed (approximately 410 nanoseconds in the presently being described embodiment) and appears as the second solid line $ signal shown in FIG-URE 10–IV to reset the GF flip-flop and to effect the transfer of the data from the D-Register 22 through the IE Switch 24 into the Exponent Register 30. The $LAST signal is generated to signify the completion of loading or placement of data into the Exponent Register.

*ADE—Add Exponent Register.*—It will be assumed for the purpose of this illustration that the ADE instruction forms the odd instruction of a pair, the preceding instruction being the LDE instruction previously described. As such there exists, in the Exponent Register 30, an exponent placed therein by the LDE instruction. With the ADE instruction in the YO- and COO-Registers 84 and 86, a new operand is obtained from the memory and placed into the D-Register 22 in the same manner as previously described with respect to the LDE instruction. In the case of the ADE instruction, however, the setting of the GF flip-flop enables the ES Switch 26 and the contents of the D-Register are transferred to the ES Adder 34. The Exponent Register 30 is in constant communication with the ES Adder 34 such that its contents are simultaneously applied, at all times, to that adder. Therefore, during GF time the contents of the Exponent Register 30, into which an exponent was previously placed, and the contents of the D-Register 22, which is the quantity to be added to that specified, are added together in the ES Adder 34 and transferred via the IE Switch 24 back into the Exponent Register 30 to thus become the new exponent. The $LAST signal is again generated signifying the end of the operation.

*STE—Store Exponent Register.*—The third in the series of instructions illustrating the capability of separate manipulation of the Exponent Register is the STE (Store Exponent Register) instruction. This instruction, as the name implies, stores the contents of the Exponent Register 30 into the memory location specified by the address portion of this instruction and logically occurs in this time. For example, an exponent might be brought into the processor by the LDE instruction and then a quantity added to that exponent by the ADE instruction. The next instruction might then be to store this new exponent into the memory by the STE instruction.

Assume now that the STE instruction is brought into the Instruction Registers 78 with the concurrence of a $DA signal. The $ORY signal which follows this $DA signal transfers the command portion of the instruction from the appropriate COE- or COO-Register through the ZOR Switch 94 into the O-Register 96. This data is then transferred to the Decode matrix 97 which provides the STORES signal which was discussed in the description of FIGURE 8–IV. The combination of the STORE signal from the matrix 97 and the occurrence of the $ORY signal sets the SDY flip-flop 94 (FIGURE 8–IV). The $SETGS signal follows the $ORY signal a short time and is utilized to generate the $START signal. With the $START signal the first $ signal is generated. Because of the presence of the STORES signal, the $START signal and the subsequent $ signal will be generated at an earlier time than was true with respect to the LDE and ADE instructions as is shown in FIGURE 10–IV by those pulses shown in dotted lines and designated by the legend "STORE."

The $ signal resets the GS flip-flop 116 and sets GF flip-flop 126. It is noted that these actions occur at different times than was the case with the previous two instructions and this modification in timing is illustrated in FIGURE 10–IV by the dotted lines bearing the label STORE. As shown, the GS flip-flop resets sooner and the GF flip-flop sets sooner than was the previous case. During GS time (that period of time when the GS flip-flop 116 was set) the ZDO Switch 32 (FIGURE 7–IV) was enabled by the STORES signal. The ZDO Switch being enabled, the contents of the Exponent Register 30 are delivered via Switch 32 to the Memory 6 and are placed into the first eight bit positions of the storage location specified by the address portion of the STE instruction. The Memory 6 stores this information from the ZDO Switch in response to the $INT signal and the output of the Command Logic 92 (FIGURE 7–IV) as is more fully explained in the aforementioned patent applicaton, Ser. No. 555,165. The memory then responds by sending a $DA signal to the processor which serves to reset the GF flip-flop. As was previously the case, with the resetting of the GF flip-flop there is generated the $LAST signal signifying that the operand is completed.

Mantissa operations

The AQ-Register 56, FIGURE 7–IV, is utilized in arithmetic operations to hold the one of the numbers of an arithmetic operation. The AQ-Register is a seventy-two bit register capable of holding 2 thirty-six bit words, one in bit positions 0–35 (the A portion) and the second in bit positions 36–71 (the Q portion) of the register. It is possible to load both portions of the register and thus provide a Double Precision type of operation involving a full seventy-two bit number.

*LDA—Load A, LDAQ, Load AQ.*—These two instructions, LDA and LDAQ, are each performed identically with respect to timing cycles and their length, with the exception that in the case of LDAQ two $DA signals are received one after the other, one for each thirty-six bit word which is required to fill the entire AQ-Register 56. Considering first the LDA instruction, it will be assumed that this instruction has been placed into the Instruction Registers 78 in the normal manner and that in response to the LDA instruction the contents of the memory location specified by the address portion of that instruction are brought to the ZDI Switch 10 with the occurrence of the $DA signal. With the generation of the $M signal, these contents (operand) are delivered from the ZDI Switch 10 through the IM Switch 12 into the M-Register 14. The $SETGS signal sets the GS flip-flop 116 which remains high with the resultant GS signal until the generation of the $ signal (the first $ signal shown by a solid line in FIGURE 10–IV). With the occurrence of the $ signal, the GS flip-flop 116 is resets, the GF flip-flop 126 is set and the operand is transferred from the M-Register 14 through the IH Switch 20 and into the H-Register 36. Because the H-Register 36 and the S Adder 38 are in constant communication, the contents of the H-Register are continuously applied to and are present in the S Adder 38. With the occurrence of the next $ signal, the GF flip-flop 126 is reset and the operand in the H-Register, and hence the S Adder, is switched through the IAQ Switch 48 into the A portion of the AQ-Register 56. The $LAST signal is generated and the operation is complete. The LDAQ (Load AQ) instruction operation is identical to that just described with the exception that in this situation the $ start signal which generates the $ signal is not a function of the first $DA signal received but is instead a function of the $DA signal received when the second thirty-six bit word is brought from the memory to the ZDI Switch 10. In this situation the 2 thirty-six bit words are sequentially placed into the seventy-two bit M-Register. Upon the occurrence of the $ signal generated as a result of the second $DA signal, the contents of the seventy-two bit M-Register are transferred via a seventy-two bit bus to the H-Register 36 and hence to the S Adder 38. From the S Adder 38 the seventy-two bits are transferred via the IAQ Switch into the AQ-Register 56 to thus fully load that register. The $LAST signal is generated to indicate the end of the operation.

*STA—Store A, STAQ—Store AQ.*—As well as the ability to load the AQ-Register separately, the ability to manipulate the mantissa separately includes the ability to store the contents of the AQ-Register or mantissa without modifying the exponent. This is done by the Store A (STA) and Store AQ (STAQ) instructions. In the case of the STA instruction, all pulses and timing cycles are identical to those of the STE instruction with the only operational variation being the path the operand takes. That is, with the STA instruction being located within the Instruction Registers 78, the $ORY signal is generated from the $DA signal which places this instruction into the Instruction Registers. The $ORY signal causes the transmission of the command portion of this instruction from the appropriate COE- or COO-Register through the ZOR Switch 94 and into the O-Register 96. In response to this placement the Decoding matrix 97 once again provides the STORES signal which serves to set the SDY flip-flop 194 which in turn effects the generation of the $SDY signal during GS time. With the occurrence of the $SETGS signal, in combination with the STORES signal, the AND-gate 198 produces that $START signal shown in FIGURE 9–IV by dotted lines. This $START signal, as was the case with STE instruction, serves to generate the first $ signal shown in FIGURE 10–IV in dotted lines. With the occurrence of this $ signal, the GS flip-flop 116 is reset and the GF flip-flop 126 is set. Prior to the setting of the GF flip-flop, however, the data on the ZDO Switch 32 was enabled by the STORES signal from the Decode matrix 97 thus allowing the contents of the AQ-Register 56, or more correctly the A portion of the AQ-Register 56, to be transferred to the memory location specified by the address portion of the STA instruction. The GF flip-flop 126 is reset and the $LAST signal specifying the end of the operation is generated.

The STAQ instruction functions identically to the STA instruction just described up to and including the generation of the $SDY signal with the exception that there is also provided from the output of the Decode matrix 97 a signal designated as Double Precision Store whose function will become more apparent as this description proceeds. This deviation is necessitated by the fact that this is the storing of 2 thirty-six bit words or a Double Precision Word and as such there must be two separate transfers into the Memory 6 one for each of the thirty-six bits. In this situation the generation of $SDY initiates the $INT signal which is sent to the Memory 6 along with the contents of the A portion of the AQ-Register. These contents are transferred through the ZAQ Switch 46 and the ZDO Switch 32 to be stored in the Memory at a specified location. With the occurrence of the next $DA signal which is sent by the memory indicating that the data transmitted was stored, the second $ signal (shown in dotted lines and designated STORE in FIGURE 10–IV) is generated to reset the GS flip-flop 116 and set the GT flip-flop 198 (FIGURE 8–IV). The second or Q portion of the AQ-Register is now transferred to the ZAQ Switch 46 and the ZDO Switch 32 to be placed into the memory location specified by the odd location of a pair specified by the address. The Memory 6 again returns a $DA pulse which serves, via AND-gate 186 and OR-gate 160 to develop the next $ signal which functions to reset the GT flip-flop 198.

The placement of operands in memory in the double precision storing operation just described is dependent upon the address given in the instruction word. That is, if the address portion specifies an odd address, the contents of the A portion of the AQ-Register are transferred to the preceding address and the contents of the Q portion of the AQ-Register to the odd location specified by the address portion of the instruction. In the case where the address portion of this instruction specifies an even location, the A portion of the AQ-Register is transferred to that location while the Q portion of the AQ-Register is transferred to the odd location immediately following that even location.

From the foregoing description of LDE, ADE, STE, LA, LAQ, STA and STQ instructions, it is seen that there has been provided the capability of manipulating, or operating upon in an individual manner, both the exponent and the mantissa of a floating point word. Thus, it is possible to retain the mantissa at a full thirty-six bits, or in the case of the double precision word, at a full seventy-two bits in order to retain greater accuracy in arithmetic operations.

Floating operations

As well as the capability of independent manipulation of the Exponent and Accumulator (AQ) Registers, the present invention provides the facility for providing simultaneous manipulation of these registers in a floating mode operation. This may be illustrated by the four instructions FLD—Floating Load, DFLD—Double Floating Load, FST—Floating Store, and DFST—Double Floating Store.

*FLD—Floating Load.*—In the performance of this instruction, the timing cycles and the fetching of the operand from the Memory 6 are the same as those described with respect to the LDE and LDA instructions. As before, the operand is transferred through the ZDI Switch 10 and the IM Switch 12 to the M-Register 14 with the transfer to the M-Register once again occurring at $M time. There is, however, this distinction. With this instruction bits 0–7 of the operand are transferred or placed into bit positions 64–71 of the M-Register while bits 8–35 of the operand are placed into bit positions 0–27 of the M-Register. The intervening bit positions of the M-Register may be considered as zeros. At the occurrence of that $ signal shown in solid lines (FIGURE 10–IV), bits 0–27 of the M-Register are delivered via the IH Switch 20 to the H-Register 36, and bits 64–71 (the exponent) are delivered via the ID Switch 16 to the D-Register 22. It should be noted that bits 0–27 of the M-Register are transferred to the first twenty-eight bits of the seventy-two bit H-Register 36. At the next $ signal, the contents of the H-Register are transferred through the S Adder 38 to the IAQ Switch 48 and into the AQ-Register 56. This is a full seventy-two bit transfer and places the mantissa, which was so positioned in the H-Register, into the first twenty-eight bits of the AQ-Register with the remaining bits of bit positions of that register being zero. At the same time, the exponent portion of the operand which was being retained within the D-Register is transferred via the IE Switch 24 to the Exponent Register 30 to complete the operation of loading a floating point word. Once again, there is a generation of $LAST to indicate the completion of the operation.

*DFLD—Double Floating Load.*—The performance of this instruction is accomplished identically to that described with respect to the LAQ instruction up to the point where the operand reaches the IM Switch 12. At this time, similarly to that performed with respect to the FLD instruction, bits 0–7 of the first thirty-six bit word brought from the Memory are placed into bit positions 64–71 of the M-Register 14 and the remaining twenty-eight bits of that word plus the thirty-six bits of the second half of the double precision word are placed into bit positions 0–63 of the M-Register. With this configuration in the M-Register, the operation is identical in transferring as was just described with respect to the FLD instruction wth the noted exception that the H-Register 36 will have a sixty-four bit mantissa placed therein with only the last eight bits of the register being zeros. The transfer of the exponent portion through the ID Switch 16 and the D-Register 22 to the Exponent Register 30 and the generation of the $LAST signal are identical to that described with respect to the FLD instruction.

*FST—Floating Store.*—The FST instruction performance is identical to that described with respect to the STE and STA instructions with the exception of the data paths taken. This instruction is utilized to store a floating point word located within the processor by a means, for example the FLD instruction previously described. It is remembered from that description that an eight bit exponent is located within the Exponent Register 30 and a twenty-eight bit mantissa is positioned in bit positions 0–27 of the AQ-Register 56. As was the case with respect to the earlier described store instructions, the combination of the STORES decode signal from the Decoding matrix 97 enables the ZDO Switch 32 to thus effect the transfer of the contents of the Exponent Register 30 to the Memory 6 to be placed into bit positions 0–7 of the address location specified by the FST instruction. At the same time, bits 0–27 of the AQ-Register 56 are transferred via the ZAQ Switch 46 to the ZDO Switch to be sent to the memory to be stored in bit position 8–35 of the same memory location. The $LAST signal is generated indicating the end of the operation.

*DFST—Double Floating Store.*—As the FST instruction resembled the Store A instruction, the DFST instruction functions similarly with respect to the STAQ instruction previously explained. The performance of the DFST instruction is the same as that described with respect to the STAQ instruction insofar as timing cycles and pulses, the data paths, however, are different.

This instruction is used to store a double precision floating point word into the memory. It will be remembered that in the DFLD instruction an eight bit exponent was placed into the Exponent Register 30 and a sixty-four bit mantissa was placed into the AQ-Register. In the execution of the DFST instruction the eight bits of the Exponent Register are transferred via the ZDO Switch 32 to bit positions 0–7 of the even memory location of an address pair. At the same time bits 0–27 of the A portion of the AQ-Register 56 are switched from that register through the ZAQ Switch on to bit positions 8–35 of the even memory location. With the occurrence now of the $DP signal, bits 28–63 of the AQ-Register are switched through the ZAQ Switch 46 and the ZDO Switch 32 for placement into the odd memory location of the address pair. With the receipt from the Memory 6 of the $DA signal signifying that the last storage operation has been completed, the $LAST signal is generated to indicate the completion of the instruction.

Thus it is seen from the foregoing description of instructions that the present invention facilitates the manipulation of the exponents and mantissas either separately or collectively and that these operations may be performed on either single or double precision words, thus greatly enhancing the capabilities of the machine.

Divide operations

In addition to the previously described abilities of exponent and mantissa manipulation the system of the present invention provides the capability of dividing in either of two senses. That is, through the two instructions designated FVD—Floating Divide, and FDI—Floating Divide Inverted, the contents of a memory location may be utilizes as either a divisor or a dividend with respect to the contents of the Exponent Register 30 and the AQ-Register 56. This ability permits a division operation regardless of the order of instruction and data words within the memory. Thus, regardless of whether the contents of the AQ-Register are to be utilized as a dividend or a divisor, the programmer can perform a division without recourse to wasteful data movement operations in order to provide a specific location order of data words.

*FDV—Floating Divide.*—Before a division operation can be performed in the system presently being described, the divisor must be negative and the dividend positive. If the numbers to be operated upon are in any other state they will be modified to place them into the state just described before the computation is made. Initially, however, for purposes of this explanation it will be assumed that the divisor is negative and the dividend is positive.

In the explanation of this instruction, it will be further assumed that the Exponent Register 30 and the AQ- Register 56 have been previously loaded, respectively, with the exponent and the mantissa of a data word which is to be utilized as the divided in a division operation. With the bringing now of the FDV instruction into the Instruction Register 78 the operand (the divisor) is obtained from the memory using the address portion of the FDV instruction and placed into the M-Register by the $M pulse. The bringing of the operand into the M-Register is the same as was done with the FLD instruction.

When the GS flip-flop 116 was set, the mantissa of the dividend, which has been stored in the AQ-Register 56, is sent from that register through the ZAQ Switch 46 and into the N-Register 40 via the IN Switch 42. The Zero indicator flip-flop 216 (FIGURE 9–IV) is reset. Also during GS time, the H-Register is coded to all zeros and the exponent of the divisor mantissa which transferred to the M-Register 14 is sent from that register via the ID Switch 16 to the D-Register 22. The GS flip-flop 116 is now reset and, because this is a divide operation providing a Divide Decode signal from the Decode matrices shown in FIGURE 7–IV, the GD1 flip-flop 140 will set. During GD1 time as is shown in FIGURE 9–IV flip-flop 212 will set because the sign of the divisor (negative) differs from the sign of the dividend (positive); i.e., $A_0 \neq M_0$. Also during GD1 the mantissa of the dividend which was placed into the N-Register is sent through the S Adder 38 and the IAQ Switch 48 back into the AQ-Register 56. At the same time the transfer of the dividend mantissa occurs, the mantissa of the divisor is transferred from the M-Register 14 through the IH Switch 20 to the H-Register 36. With the divisor now in the H-Register 36 and hence in the S Adder 38, because this register and adder are in constant communication, the S Adder 38 is checked to determine if it is equal to zero. If the divisor is zero the Zero flip-flop 216 is set indicating the illegal action of an attempt to divide by zero. This condition is illustrated in FIGURE 9–IV at AND-gate 218 in a manner previously described. The setting of the Zero flip-flop 216 will cause the processor to cease its present operation and enter into what is termed a "fault routine" as is more thoroughly explained in copending patent application Ser. No. 560,684 entitled "Data Processing System" by David L. Bahrs et al., filed June 27, 1966, and assigned to the assignee of the present invention.

Assuming, however, that the divisor is not equal to zero, the GD1 flip-flop 140 is now reset and the GD2 flip-flop 144 is set. During GD2 time the dividend mantissa is sent from the AQ-Register 56 via the ZAQ Switch 46 and the IN Switch 42 to the N-Register 40. Also during GD2 time, a count of 38 is placed into the G Counter 28. Thus, at the end of GD2 time the status of the several registers is that of the dividend mantissa being in the N-Register 40 and the divisor mantissa being in the H-Register 36. The dividend exponent is in the Exponent Register 30 and the divisor exponent is in the D-Register 22. The GD2 flip-flop 144 now resets and the GO and CMFF flip-flops 148 and 146, respectively, are set.

With the divisor now in the H-Register 36 and the dividend in the N-Register 40, a comparison is made of these two numbers in the S Adder 38. In FIGURE 7–IV, the result of this comparison is shown by the $SC_0$ signal from the S Adder. In the event that the magnitude of the contents of the N-Register is greater than the magnitude of the contents of the H-Register there will be a carry from the S Adder 38. The $SC_0$ signal will be at a high level or a binary 1 and designated $SC_0$. The converse being true, $SC_0$ is a binary 0 ($\overline{SC_0}$). Assuming now the first possibility, that is $SC_0=1$, the dividend mantissa in the N-Register 40 is shifted to the right one position and the Exponent Increment flip-flop (EIFF) 188 is set. The output of the EIFF flip-flop 188 is applied to the ES Adder 34 to increment the exponent (the dividend exponent) retained in the Exponent Register 30 by one. This cycle is repeated with the GO and CMFF flip-flops remaining set until there is no carry from the S Adder; i.e., $SC_0=0$. The numbers are now in a normalized state. When $SC_0=0$, the CMFF flip-flop 146 is reset but the GO flip-flop 148 remains set and the first divide cycle is entered with the G Counter 28 now being decremented to a count of 37. With the resetting of the CMFF flip-flop, the AQ-Register is set to all zeros.

If $SC_0$ was equal to zero as opposed to the $SC_0=1$ situation just described, there is no carry from the S Adder 38 and at the time the CMFF flip-flop 146 is reset, the dividend mantissa located in the N-Register 40 is shifted to the left by one position.

The actual dividing operation now begins with the AQ-Register 56 set to all zeros and the G Counter decremented to a count of 37. The present system now enters what is called a series of successive GO cycles. With each GO cycle the contents of the H-Register 36 and the N-Register 40 are summed in the S Adder 38. Bits 1–35 of the AQ-Register 56 are transferred with each GO cycle via the ZAQ Switch 46 and the IAQ Switch 48 to bits 0–34 of the AQ-Register with the carry out position (the $SC_0$ signal) of the S Adder 38 being placed into bit position 35 of the AQ-Register. This is in effect providing left shift by one of the AQ-Register and develops a partial quotient in that register starting with bit position 35 and working toward the left in that register with each successive GO cycle.

After a GO cycle in which the signal is $SC_0=1$, indicating that a division has been accomplished, the new remainder, the output of the S Adder 38, is shifted left one position into the N-Register 40 through the IN Switch 42. In the situation where the signal $SC_0=0$, the contents of the N-Register are shifted left by one position by transferring these contents out of the N-Register 40, through the IN Switch 42, and back into the N-Register in the shifted position.

This shifting operation and placement of the carry from the S Adder into the AQ-Register will continue with the G Counter 28 decrementing by one with each GO cycle until such time as the G Counter reaches a count of 3. When the G Counter reaches a count of 3, all zeros are placed into the H-Register. During the next GO cycle, the G Counter is now equal to 2 ($G=2$) and because the QSF flip-flop 212 (FIGURE 9–IV) has been previously set, the ones complement of the AQ-Register which represents a quotient is sent via the ZAQ Switch 46 and the IN Switch 42 to the N-Register 40. The complementing function is performed in the ZAQ Switch. During the next GO cycle with the G Counter having a count of 1 ($G=1$), the $K_{72}$ flip-flop 204 is set and the output of this flip-flop is delivered to bit position 71 of the S Adder 38 to thus provide a twos complement of the quotient at the output of the S Adder 38 which is sent to the AQ-Register 56.

With the setting now of the GF-flip-flop 126, the $K_{72}$ flip-flop and the GO flip-flop are reset. If set, the Zero flip-flop 216 is also reset. During the time the GF flip-flop 126 is set the divisor exponent is subtracted from the dividend exponent by sending the ones complement of the divisor exponent which is being maintained in the D-Register 22 to the ES Adder 34 via the ES Switch 26. Inasmuch as this is a GF time and that the FDV+FDI Decode signal is present, AND-gate 228 (FIGURE 9–IV) has a binary 1 output indicating a carry two bit position 7 of the ES Adder 34. This operation provides the twos complement of the divisor exponent to permit a subtraction operation.

The difference in the exponents; i.e., the dividend exponent in the Exponent Register 30 and the divisor exponent in the D-Register 22, results from the arithmetic operation in the ES Adder 34. The difference between these two numbers is sent back to the Exponent Register 30 through the IE Switch 24. This action will take place only if the Zero flip-flop 216 was not set during the $GO \cdot G=1$ cycle. The GF flip-flop is now reset, the $LAST signal is generated indicating the end of the operation, and the next instruction is obtained. If the Zero flip-flop 216 was set, a quantity equal to $-2^7$ is placed into the Exponent Register 30, thus indicating a floating point zero or an actual number of zero.

The foregoing description was based upon the assumption that the divisor was negative and the dividend was positive. In the event that the dividend is not positive at GS time when the dividend is being transferred from the AQ-Register to the N-Register, a ones complementing function is performed in the ZAQ Switch 46. It may be seen from FIGURE 9–IV that this condition will result in the setting of the $K_{72}$ flip-flop at this time. Thus, when the dividend is returned to the AQ-Register 56 during GD1 time, it is in its twos complemented form. In the event that the divisor is positive, a ones complementing is done in the IH Switch 20 as the divisor passes through that switch on its way from the M-Register 14 to the H-Register 36. This is also done at GD1 time. In this latter situation the $K_{72}$ flip-flop is set and remains set such that the twos complementing is done continuously in the S Adder to the ones complemented divisor in the H-Register. The $K_{72}$ flip-flop is again reset at GD2 time. The $K_{72}$ flip-flop may also be reset during the last divide cycle or at that time specified by the expression $GO \cdot G = 3$.

Sign correction of the quotient is done during $GO \cdot G = 1$ time according to the state of the QSF flip-flop 212. If QSF was set during GD1 time, then the sign of the quotient is changed during $GO \cdot G = 1$ time.

*FDI—Floating Divide Inverted.—* In the explanation of the performance of this instruction, it will again be assumed that the Exponent Register and the AQ-Register have been previously loaded respectively with the exponent and the mantissa of the divisor. The FDI instruction is now brought into the Instruction Registers 78 and the operand, which in this case is the dividend, is obtained from the memory using the address portion of the FDI instruction and placed into the M-Register at $M time.

As was the requirement in the FDV instruction, computation must be made with the divisor negative and the dividend positive and if the numbers to be operated upon are in any other state, they will be modified to place them into the state just described before operation is made.

Assuming first that the divisor is negative and the dividend is positive, the setting of the GS flip-flop effects the transfer of the mantissa of the divisor, which has been stored in the AQ-Register 56, from that register through the ZAQ Switch 46 and into the N-Register 40 via the IN Switch 42. The Zero flip-flop 216 (FIGURE 9–IV) is reset. Also during GS time the H-Register is cleared to all zeros and the exponent of the dividend mantissa which is in the M-Register 14 is sent from that register via the ID Switch 16 to the D-Register 22. The GS flip-flop 116 is now reset and, because this is a divide operation providing a Divide Decode signal from the Decode matrices shown in FIGURE 7–IV, the GD1 flip-flop 140 will set.

During GD1 time and because the signs of the dividend and divisor were different; i.e., $A_0 \neq M_0$, the QSF flip-flop 212 will set (see FIGURE 9–IV). Also during GD1 time the mantissa of the divisor which has been placed into the N-Register 40 is sent through the S Adder 38 and the IAQ Switch 48 back into the AQ-Register 56 and the mantissa of the dividend is transferred from the M-Register 14 through the IH Switch 20 and the H-Register 36.

At the end of GD1 time the divisor in the N-Register 40 as it appears in the S Adder 38 is checked to determine if it is zero. If the divisor is zero, the Zero flip-flop 216 (FIGURE 9–IV) is set indicating the illegal action of an attempt to divide by zero. In this situation the operation is identical to that described with respect to the FDV instruction and the system will enter a fault routine as is more fully explained in the aforementioned copending application, Ser. No. 560,684.

Assuming that the divisor is not zero and that the dividing operation is legal, the GD1 flip-flop 140 is reset and the GD2 flip-flop 144 is set. During GD2 time the contents of the H-Register, the mantissa of the dividend, are sent from the H-Register 36 through the S Adder 38 and the IN Switch 42 into the N-Register 40. At the same time, the divisor which is being retained in the AO-Register 56 is sent via the ZAQ Switch 46 and the IH Switch 20 into the H-Register 36. The mantissa of the divisor is now in the H-Register 36 and the mantissa of the dividend is in the N-Register 40. As before, a fixed count of 38 is placed into the G Counter 28. Also during GD2 time, the contents of the Exponent Register 30 (the divisor exponent) are sent via the ES Adder 54 and the ID Switch 16 to the D-Register 22 while the contents of the D-Register (the dividend exponent) are sent via the IE Switch 24 to the Exponent Register 30. The GD2 flip-flop now resets and the GO and CMFF flip-flops 148 and 146, respectively, are set.

The comparison of the divisor in the H-Register and the dividend in the N-Register 40 is now made in the S Adder 38 with the result of this comparison being reflected in the $SC_0$ signal. As before, if the contents of the N-Register are greater than the magnitude of the H-Register, the $SC_0$ signal will be at a high level (binary 1). The converse being true, $SC_0$ is again a binary 0. Assuming first that $SC_0 = 1$, the dividend mantissa in the N-Register is shifted to the right one position and the EIFF flip-flop 188 is set. The output of the EIFF flip-flop 188 is applied to the ES Adder 34 to increment by one the dividend exponent retained in the Exponent Register 30. This cycle is repeated with the GO and CMFF flip-flops remaining set until there is no carry from the S Adder; i.e., $SC_0 = 0$, signifying that the numbers are normalized. When $SC_0 = 0$, the CMFF flip-flop 146 is reset and the GO flip-flop 148 remains set and the first divide cycle is entered with the G Counter now being decremented to a count of 37. With the resetting of CMFF the AQ-Register is set to all zeros. If $SC_0$ was equal to zero, there is no carry from the S Adder 34 and at the time the CMFF flip-flop is reset the dividend mantissa located in the N-Register 40 is shifted left by one position.

The actual dividing operation now begins and is substantially identical to that described with respect to the FDV instruction. With the AQ-Register having been set to zero and the G Counter to a coun of 37, the machine now enters the series of successive GO cycles and with each cycle the contents of the H-Register and the N-Register are summed in the S Adder. Bits 1–35 of the AQ-Register 56 are again transferred with each GO cycle via the ZAQ Switch 46 and the IAQ Switch 48 to bit positions 0–34 of the AQ-Register with the carry out of the S Adder 38 being placed into bit position 35 of the AQ-Register. Thus, a partial quotient is developed in the AQ-Register starting with bit 35 and working toward the left in that register with each GO cycle. After a GO cycle in which the signal is $SC_0 = 1$, indicating that a division has been accomplished, the output of the S Adder 38 (the new remainder) is shifted left one position, via IN Switch 42, into the N-Register 40. In the situation where the signal is $SC_0 = 0$, the N-Register contents are shifted left one position in the process of transferring the contents of that register through the IN Switch 42 back into the N-Register 40. This shifting operation and placing of the carry from the S Adder 38 into the AQ-Register will continue with the G Counter 28 decrementing by one with each GO cycle until such time as the G Counter reaches a count of 3 ($G = 3$) at which time all zero are placed into the H-Register.

During the next GO cycle, with the G Counter now equal to 2 ($G = 2$) the ones complement of the AQ-Register, which represents a quotient, is sent via the ZAQ Switch 46 and the IN Switch 42 to the N-Register 40. This complementing function is performed in the ZAQ Switch and is a function of the set state of the QSF flip-flop 212 (FIGURE 9–IV). During the next GO cycle with the G Counter having a count of one (G=1), the $K_{72}$ flip-flop 204 is set and the output of this flip-flop is delivered to bit position 71 of the S Adder 38 to thus provide a twos complement of the quotient at the output of that S Adder 38. This twos complemented quotient is sent via the IAQ Switch 48 to the AQ-Register 56 for retention therein. The GF flip-flop 126 is now set and the $K_{72}$ flip-flop, the GO flip-flop and the Zero flip-flop 216, if set, are reset. During the time the GF flip-flop 126 is set, the divisor exponent is subtracted from the dividend exponent by sending the ones complement of the divisor exponent (D-Register 22) to the ES Adder 34 via the ES Switch 26. Inasmuch as this is a GF time and the FDV+FDI Decode signal is present, AND-gate 228 (FIGURE 9–IV) has a binary 1 output indicating a carry to bit position 7 of the ES Adder 34. This operation provides the twos complement of the divisor exponent to permit a subtraction operation.

The difference in the exponents; i.e., the dividend exponent in the Exponent Register 30 and the divisor exponent in the D-Register 22 results from the arithmetic operation in the ES Adder 34 and this difference is sent back to the Exponent Register 30 through the IE Switch 24. This action will take place only if the Zero flip-flop 216 was not set during the GO·G=1 cycle. The negative quotient was sent to the AQ-Register. The GF flip-flop is now reset and the next instruction is obtained. With the GF flip-flop now reset, the $LAST signal is generated and the next instruction, e.g. an instruction to store the results in memory, is obtained. If the Zero flip-flop 216 was set, a quantity equal to $-2^7$ is placed into the Exponent Register 30 thus indicating a floating point 0 or an actual number of 0.

The foregoing description was based upon the assumption that the divisor was negative and the dividend was positive. In the event the divisor was not negative at GS time when the divisor is being transferred from the AQ-Register 56 to the N-Register 40, a ones complementing function is performed in the ZAQ Switch 46. Again, from FIGURE 9–IV it is seen that at this time the $K_{72}$ flip-flop is set such that when the divisor is returned to the AQ-Register during GD1 time it is in its twos complemented form. In the event that the dividend is negative, the ones complementing is done in the IH Switch 20 as the dividend passes through on its way from the M-Register 14 to the H-Register 36. This is done at GD1 time. Again, as is shown in FIGURE 9–IV, the $K_{72}$ flip-flop is set and the dividend is twos complemented during GD2 when the contents of the H-Register are transferred through the S Adder 38 and the IN Switch 42 into the N-Register 40.

As before, sign correction of the quotient is done during GO·G=1 time according to the state of the QSF flip-flop 212. If QSF were set during GD1 time, then the sign of the quotient is changed during GO·G=1 time.

While the two divide instructions just described, FDV and FDI, are both single precision operations it is also possible, in a manner evident from the entire previous discussion, to perform these operations in a double precision mode using sixty-four bit mantissas and an eight bit exponent to develop a quotient having a sixty-four bit mantissa and eight bit exponent.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements, without departing from these principles. The appended claims are therefore intended to cover and embrace any such modifications, within the limits only of the true spirit and scope of the invention.

What is claimed is:

1. In a data processing system the combination comprising: a memory device for storing data and instructions at addressable locations; a plurality of asynchronous communicating devices including a data processor for manipulating data in accordance with the instructions of a program, each of said communicating devices supplying an interrupt signal, a command code, data, and an address of a location of said memory device; memory controller connected to said memory device and to said communicating device to receive said interrupt signals, command codes, data, and addresses and responsive to the receipt of an interrupt signal for manipulating the data accompanying said interrupt signal in accordance with the command code accompanying said interrupt signal; said memory controller also responsive to the receipt of a plurality of interrupt signals for awarding priority to one of the communicating devices from which an interrupt signal is received and to execute the command code received from the communicating device to which priority is granted.

2. In a data processing system the combination comprising: a memory device for storing data and instructions at addressable locations; a plurality of asynchronous communicating devices each for manipulating data and each requiring access to said memory device for transferring data to and from said memory device, each of said communicating devices supplying an interrupt signal when access is required to said memory device, each communicating device also providing a command code, data, and an address of a location of said memory device; a memory controller connected to said memory device and to said communicating device to receive said interrupt signals, command codes, data, and addresses and responsive to the receipt of an interrupt signal for manipulating the data accompanying said interrupt signal in accordance with the command code accompanying said interrupt signal; said memory controller also responsive to the receipt of a plurality of interrupt signals for awarding priority to one of the communicating devices from which an interrupt signal is received and to execute the command code received from the communicating device to which priority is granted.

3. In a data processing system the combination comprising: a memory device for storing data and instructions at addressable locations; a plurality of asynchronous communicating devices including a data processor for manipulating data in accordance with the instructions of a program, each of said communicating devices supplying an interrupt signal, a command code, data, and an address of a location of said memory device; a memory controller connected to said memory device and to said communicating device for performing commands provided thereto by communicating devices including storing and retrieving data at addressable locations in said memory device and for receiving interrupt signals, command codes, data, and addresses from said communicating devices, said memory controller responsive to the receipt of an interrupt signal for manipulating data accompanying the said interrupt signal in accordance with the command code accompanying said interrupt signal; said memory controller also responsive to the receipt of a plurality of interrupt signals for awarding priority to one of the communicating devices from which an interrupt signal is received and to execute the command code received from the communicating device to which priority is granted.

4. In a data processing system the combination comprising: a memory device for storing data and instructions at addressable locations; a plurality of asynchronous communicating devices including a data processor for manipulating data in accordance with the instructions of a program, each of said communicating devices supplying an interrupt signal, a command code, data, and an address of a location of said memory device; a memory controller connected to said memory device and to said communicating device to receive said interrupt signals, command codes, data, and addresses and responsive to the receipt of an interrupt signal for manipulating the data accompanying said interrupt signal in accordance with the command code accompanying said interrupt signal; said memory controller also responsive to the receipt of a plurality of interrupt signals for awarding priority to one of the communicating devices from which an interrupt signal is received and to execute the command code received from the communicating device to which priority is granted; said memory controller responsive to the awarding of priority generating a cycle started pulse and providing said pulse to the communicating device to which priority is awarded; said communicating devices responsive to the receipt of said cycle started pulse for removing from an input to said memory controller the command code and address provided by the communicating device receiving said pulse.

5. In a data processing system the combination comprising: a memory device for storing data and instructions at addressable locations; a plurality of asynchronous communicating devices each for manipulating data and each requiring access to said memory device for transferring data to and from said memory device, each of said communicating devices generating an interrupt signal when access is required to said memory device, each communicating device also providing a command code, data, and an address of a location of said memory device; a memory controller connected to said memory device and to said communicating device to receive said interrupt signals, command codes, data, and addresses and responsive to the receipt of an interrupt signal for manipulating the data accompanying said interrupt signal in accordance with the command code accompanying said interrupt signal; said memory controller also responsive to the receipt of a plurality of interrupt signals awarding priority to one of the communicating devices from which an interrupt signal is received and executing the command code received from the communicating device to which priority is granted; said memory controller responsive to the awarding of priority for generating a cycle started pulse and providing said pulse to the communicating device to which priority is awarded; said communicating devices responsive to the receipt of said cycle started pulse removing from an input to said memory controller the command code and address provided by the communicating device receiving said pulse.

6. In a data processing system the combination comprising: a memory device for storing data and instructions at addressable locations; a plurality of asynchronous communicating devices including a data processor for manipulating data in accordance with the instructions of a program, each of said communicating devices including supplying an interrupt signal, a command code, data, and an address of a location of said memory device; a memory controller connected to said memory device and to said communicating device performing commands provided thereto by communicating devices including storing and retrieving data at addressable locations in said memory device and receiving interrupt signals, command codes, data, and addresses from said communicating devices, said memory controller responsive to the receipt of an interrupt signal manipulating data accompanying the said interrupt signal in accordance with the command code accompanying said interrupt signal; said memory controller also responsive to the receipt of a plurality of interrupt signals awarding priority to one of the communicating devices from which an interrupt signal is received and executing the command code received from the communicating device to which priority is granted; said memory controller responsive to the awarding of priority generating a cycle started pulse and providing said pulse to the communicating device to which priority is awarded; said communicating devices responsive to the receipt of said cycle started pulse removing from an input to said memory controller the command code and address provided by the communicating device receiving said pulse.

7. In a data processing system the combination comprising: a memory device for storing data and instructions at addressable locations; a plurality of asynchronous communicating devices each manipulating data and each requiring access to said memory device for transferring data to and from said memory device, each of said communicating devices generating an interrupt signal when access is required to said memory device, each communicating device also providing a command code, data, and an address of a location of said memory device; a memory controller connected to said memory device and to said communicating device performing commands provided thereto by communicating devices including storing and retrieving data at addressable locations in said memory device and for receiving interrupt signals, command codes, data, and addresses from said communicating devices, said memory controller responsive to the receipt of an interrupt signal manipulating data accompanying the said interrupt signal in accordance with the command code accompanying said interrupt signal; said memory controller also responsive to the receipt of a plurality of interrupt signals awarding priority to one of the communicating devices from which an interrupt signal is received and executing the command code received from the communicating device to which priority is granted.

8. In a data processing system the combination comprising: a memory device for storing data and instructions at addressable locations; a plurality of asynchronous communicating devices each manipulating data and each requiring access to said memory device to transfer data to and from said memory device, each of said communicating devices generating an interrupt signal when access is required to said memory device, each communicating device also providing a command code, data, and an address of a location of said memory device; a memory controller connected to said memory device and to said communicating devices to perform commands provided thereto by communicating devices including storing and retrieving data at addressable locations in said memory device and receiving interrupt signals, command codes, data, and addresses from said communicating devices, said memory controller responsive to the receipt of an interrupt signal manipulating data accompanying the said interrupt signal in accordance with the command code accompanying said interrupt signal; said memory controller also responsive to the receipt of a plurality of interrupt signals awarding priority to one of the communicating devices from which an interrupt signal is received and executing the command code received from the communicating device to which priority is granted; said memory controller responsive to the awarding of priority generating a cycle started pulse and providing said pulse to the communicating device to which priority is awarded; said communicating devices responsive to the receipt of said cycle started pulse removing from an input to said memory controller the command code and address provided by the communicating device receiving said pulse.

9. In a data processing system the combination comprising: a memory device for storing data and instructions at addressable locations; a plurality of communicating devices each for manipulating data and each requiring access to said memory device for inserting information into and retrieving information from said memory device, each of said communicating devices generating an interrupt signal when access is required to said memory device, each communicating device also providing a command code, an address of a location of said memory device, and data when information is to be inserted into said memory device; a memory controller connected to said memory device and to said communicating device to receive said interrupt signals, command codes, data, and addresses and responsive to the receipt of an interrupt signal to execute the command code accompanying said interrupt signal; said memory controller also responsive to the receipt of a plurality of interrupt signals awarding priority to one of the communicating devices from which an interrupt signal is received and executing the command code received from the communicating device to which priority is granted.

10. In a data processing system the combination comprising: a memory device for storing data and instructions at addressable locations; a data processor for manipulating data in accordance with the instructions of a program, said processor providing an interrupt signal, a command code, and an address of a location of said memory device; a memory controller connected to said memory device and to said processor for receiving said interrupt signal, command code, and address and responding to the interrupt signal to initiate execution of the command represented by said code; said memory controller responsive to the initiation of execution of said command generating a cycle started pulse and providing said pulse to said processor; said processor responsive to the receipt of said cycle started pulse removing said address from an input to said memory controller.

References Cited

UNITED STATES PATENTS

| | | | |
|---|---|---|---|
| 3,029,414 | 4/1962 | Schrimpf | 340—172.5 |
| 3,061,192 | 10/1962 | Terzian | 235—157 |
| 3,063,036 | 11/1962 | Reach et al. | 340—172.5 |
| 3,200,380 | 8/1965 | MacDonald et al. | 340—172.5 |
| 3,242,467 | 3/1966 | Lamy | 340—172.5 |

PAUL J. HENON, Primary Examiner

P. R. WOODS, Assistant Examiner